US011186265B2

(12) United States Patent
Ueno et al.

(10) Patent No.: US 11,186,265 B2
(45) Date of Patent: Nov. 30, 2021

(54) METHOD AND DEVICE FOR COLLECTING AND SUPPLYING BRAKE FLUID

(71) Applicants: HONDA MOTOR CO., LTD., Tokyo (JP); JAPAN MACHINERY COMPANY, Tokyo (JP)

(72) Inventors: Nobuyuki Ueno, Tokyo (JP); Eiji Shiga, Tokyo (JP); Tomoyasu Ito, Tokyo (JP)

(73) Assignees: HONDA MOTOR CO., LTD., Tokyo (JP); JAPAN MACHINERY COMPANY, Tokyo (JP)

( * ) Notice: Subject to any disclaimer, the term of this patent is extended or adjusted under 35 U.S.C. 154(b) by 0 days.

(21) Appl. No.: 16/629,584

(22) PCT Filed: Jul. 13, 2017

(86) PCT No.: PCT/JP2017/025533
§ 371 (c)(1),
(2) Date: Jan. 9, 2020

(87) PCT Pub. No.: WO2019/012645
PCT Pub. Date: Jan. 17, 2019

(65) Prior Publication Data
US 2021/0078560 A1 Mar. 18, 2021

(51) Int. Cl.
*B60T 17/00* (2006.01)
*B60T 17/22* (2006.01)
(Continued)

(52) U.S. Cl.
CPC .......... *B60T 17/222* (2013.01); *B60T 17/00* (2013.01); *B60T 17/06* (2013.01); *B67D 7/02* (2013.01); *B67D 7/763* (2013.01)

(58) Field of Classification Search
CPC ....... B60T 17/00; B60T 17/222; B67D 7/763; B67D 7/02–0294; F16D 2125/16;
(Continued)

(56) References Cited

U.S. PATENT DOCUMENTS

| 4,415,071 A | * | 11/1983 | Butler | ................. | B60T 17/222 188/352 |
| 6,290,760 B1 | * | 9/2001 | Taivalkoski | ....... | B01D 19/0057 222/72 |

(Continued)

FOREIGN PATENT DOCUMENTS

| JP | 60-034065 | 3/1985 |
| JP | 01-026957 | 5/1989 |

(Continued)

OTHER PUBLICATIONS

Indian Office Action for Indian Patent Application No. 202017005673 dated Sep. 30, 2020.
(Continued)

*Primary Examiner* — Andrew D StClair
(74) *Attorney, Agent, or Firm* — Amin, Turocy & Watson, LLP

(57) ABSTRACT

This device for collecting and supplying brake fluid has a gas-liquid separation tank divided into a lower chamber and an upper chamber with a partition wall interposed therebetween. Connected to the gas-liquid separation tank are: a collection line for collecting brake fluid from the brake system of a vehicle in the gas-liquid separation tank; a circulation line for extraction of brake fluid from the lower chamber and the return thereof to the lower chamber; and a replenishment line for replenishing the gas-liquid separation tank with fresh brake fluid. Air intake for the brake system is performed via a main intake line, and air intake for the gas-liquid separation tank is performed via an auxiliary intake line. Both the main intake line and auxiliary intake line are connected to an auxiliary tank.

6 Claims, 6 Drawing Sheets

(51) Int. Cl.
*B60T 17/06* (2006.01)
*B67D 7/02* (2010.01)
*B67D 7/76* (2010.01)

(58) Field of Classification Search
CPC ......... B60K 2015/0777; F01M 11/045; F01M 11/0458; F16H 57/0408
See application file for complete search history.

(56) References Cited

U.S. PATENT DOCUMENTS

| | | | |
|---|---|---|---|
| 6,443,192 B1* | 9/2002 | Erwin | B60T 17/222 116/227 |
| 2015/0069070 A1* | 3/2015 | Iwaya | F02M 37/0082 220/563 |

FOREIGN PATENT DOCUMENTS

| | | |
|---|---|---|
| JP | 03-010118 | 3/1991 |
| JP | 09-207998 | 8/1997 |
| JP | 3224770 | 11/2001 |
| JP | 2002-080098 | 3/2002 |

OTHER PUBLICATIONS

International Search Report and Written Opinion for International Application No. PCT/JP2017/025533 dated Oct. 17, 2017, 9 pages.
Chinese Office Action for Chinese Patent Application No. 201780093130.6 dated Jul. 16, 2021.

* cited by examiner

METHOD AND DEVICE FOR COLLECTING AND SUPPLYING BRAKE FLUID

TECHNICAL FIELD

The present invention relates to brake fluid collection and supply method and device for performing gas-liquid separation on brake fluid collected from a brake system of a vehicle body and supplying the brake fluid subjected to the gas-liquid separation to the vehicle body.

BACKGROUND ART

If the brake system of the vehicle body is filled with brake fluid containing moisture or gas such as air, the vehicle may fail to exercise the original brake performance sufficiently. From this perspective, Japanese Utility Model Application No. 60-034065 has suggested a brake fluid injection device that can remove air from brake fluid. In addition, Japanese Patent Publication No. 01-026957 has disclosed a liquid vacuum filling device that defoams brake fluid without bringing the brake fluid in contact with air.

Furthermore, the present applicant has suggested a brake fluid filling device that removes moisture from brake fluid and supplies the resulting brake fluid to a brake system in Japanese Patent No. 3224770. In this manner, gas or moisture is removed generally from the brake fluid when the brake system of the vehicle body is filled with the brake fluid.

SUMMARY OF INVENTION

Incidentally, the devices disclosed in Japanese Utility Model Application No. 60-034065, Japanese Patent Publication No. 01-026957, and Japanese Patent No. 3224770 include a number of tanks and lines. Therefore, the structure has become complicated and large.

It is a main object of the present invention to provide a brake fluid collection and supply method for performing gas-liquid separation on brake fluid collected from a vehicle body of a four-wheeled vehicle, a two-wheeled vehicle, or the like and then supplying the thus-obtained brake fluid to a brake system.

It is another object of the present invention to provide a brake fluid collection and supply device with a simple and compact structure.

According to one embodiment of the present invention, a brake fluid collection and supply method for performing gas-liquid separation on brake fluid collected from a brake system of a vehicle body and supplying the brake fluid after the gas-liquid separation to the vehicle body includes: a collecting step of, while drawing gas in a gas-liquid separation tank sectioned into a lower chamber and an upper chamber by a section wall including an opening through a sub-tank disposed on a downstream side of the gas-liquid separation tank, collecting the brake fluid in the brake system to the lower chamber through a collection line; a replenishing step of, while drawing gas in the brake system only through the sub-tank, replenishing the gas-liquid separation tank with the new brake fluid; and a supplying step of, while drawing gas in a main intake line only through the sub-tank, supplying the brake fluid in the lower chamber to the brake system, wherein in the collecting step and the replenishing step, the gas-liquid separation is performed by circulating the brake fluid in the lower chamber through a circulation line where the brake fluid is discharged from the lower chamber and returned to the lower chamber, and in the supplying step, the circulation of the brake fluid in the lower chamber is stopped.

According to another embodiment of the present invention, a brake fluid collection and supply device for performing gas-liquid separation on brake fluid collected from a brake system of a vehicle body and supplying the brake fluid after the gas-liquid separation to the vehicle body includes: a gas-liquid separation tank sectioned into a lower chamber and an upper chamber by a section wall including an opening; a sub-tank to which gas in the upper chamber can flow; a collection line through which the brake fluid is collected from the brake system to the gas-liquid separation tank; an intake unit configured to draw gas from the gas-liquid separation tank through the sub-tank; a circulation line used to discharge the brake fluid from the lower chamber and return the brake fluid to the lower chamber; a circulating unit that is provided to the circulation line and configured to circulate the brake fluid in the lower chamber in the circulation line; a supply line that supplies the brake fluid in the lower chamber to the brake system; a replenishing line that replenishes the gas-liquid separation tank with the new brake fluid; and a liquid transferring unit that is provided to the replenishing line and configured to transfer the new brake fluid to the gas-liquid separation tank, wherein the intake unit performs selectively one of drawing gas through both the gas-liquid separation tank and the sub-tank and drawing gas through only the sub-tank.

In this manner, in the present invention, the gas-liquid separation tank is sectioned into the lower chamber and the upper chamber. Therefore, circulating the brake fluid in the lower chamber allows the brake fluid to make a counterflow stream in the lower chamber and as a result, the gas-liquid separation in a first stage can be performed. Next, the gas that has been separated from the brake fluid, passed the opening, and entered the upper chamber causes counterflow in the upper chamber; thus, the gas-liquid separation in a second stage can be performed. Furthermore, the gas resulting from the gas-liquid separation also causes a counterflow in the sub-tank and thus, the gas-liquid separation in a third stage is performed.

That is to say, by the above structure, the gas-liquid separation can be performed three times. Therefore, it is only necessary that the gas-liquid separation tank and the sub-tank are provided as the device to perform the gas-liquid separation. Accordingly, the structure can be simplified and reduced in size.

In addition, the collection of the brake fluid from the brake system (collecting step) and the replenishment of the gas-liquid separation tank with the new brake fluid (replenishing step) are performed in the negative pressure environment formed by drawing gas from the gas-liquid separation tank and the sub-tank. Thus, the brake fluid will not be in contact with the atmosphere. Furthermore, the brake fluid under the negative-pressure environment boils at the low pressure even at room temperature; therefore, the gas and moisture in the brake fluid is discharged. From the above reasons, the entry of air or moisture in the brake fluid can be suppressed.

Moreover, in the replenishing step before the supplying step, the brake system also has the negative pressure. Therefore, by making the gas-liquid separation tank have the positive pressure in the supplying step, the brake fluid in the lower chamber can easily move to the brake system. That is to say, the brake fluid free of air or moisture can be easily supplied to the brake system.

It is preferable that the new brake fluid as a replenishment is introduced to the upper chamber. This is because the new brake fluid causes a counterflow in the upper chamber is promoted by. Therefore, in combination with the circulation of the brake fluid in the lower chamber, the efficiency of the gas-liquid separation is improved further.

The circulating unit that circulates the brake fluid in the lower chamber may function also as the supplying unit that supplies the brake fluid from the lower chamber to the brake system. In this case, the brake fluid collection and supply device includes fewer components and thus, can be simplified and reduced in size further. For this purpose, the supply line may be branched from the circulation line. Needless to say, the circulating means (supplying means) circulates the brake fluid in the lower chamber selectively in one of the circulation line and the supply line.

The gas separated from the brake fluid moves upward with the stream caused as the air in the gas-liquid separation tank is drawn through the sub-tank disposed above the gas-liquid separation tank. The separated brake fluid drops downward with its own weight. Therefore, it is preferable that the sub-tank is disposed above the gas-liquid separation tank. Thus, the gas led out from the upper chamber can easily move to the sub-tank.

The gas-liquid separation tank preferably has a horizontal cross-sectional shape that is approximately quadrangular. This is because the rectangular shape can generate the counterflow more easily than the other shapes.

Furthermore, the lower chamber, the upper chamber, and the sub-tank preferably have the capacity decreasing in this order. This is because the gas-liquid separation is active in this order.

DESCRIPTION OF EMBODIMENTS

A preferred embodiment of a brake fluid collection and supply method according to the present invention and a brake fluid collection and supply device for carrying out the method is described below in detail with reference to the attached drawings.

Figure 1:
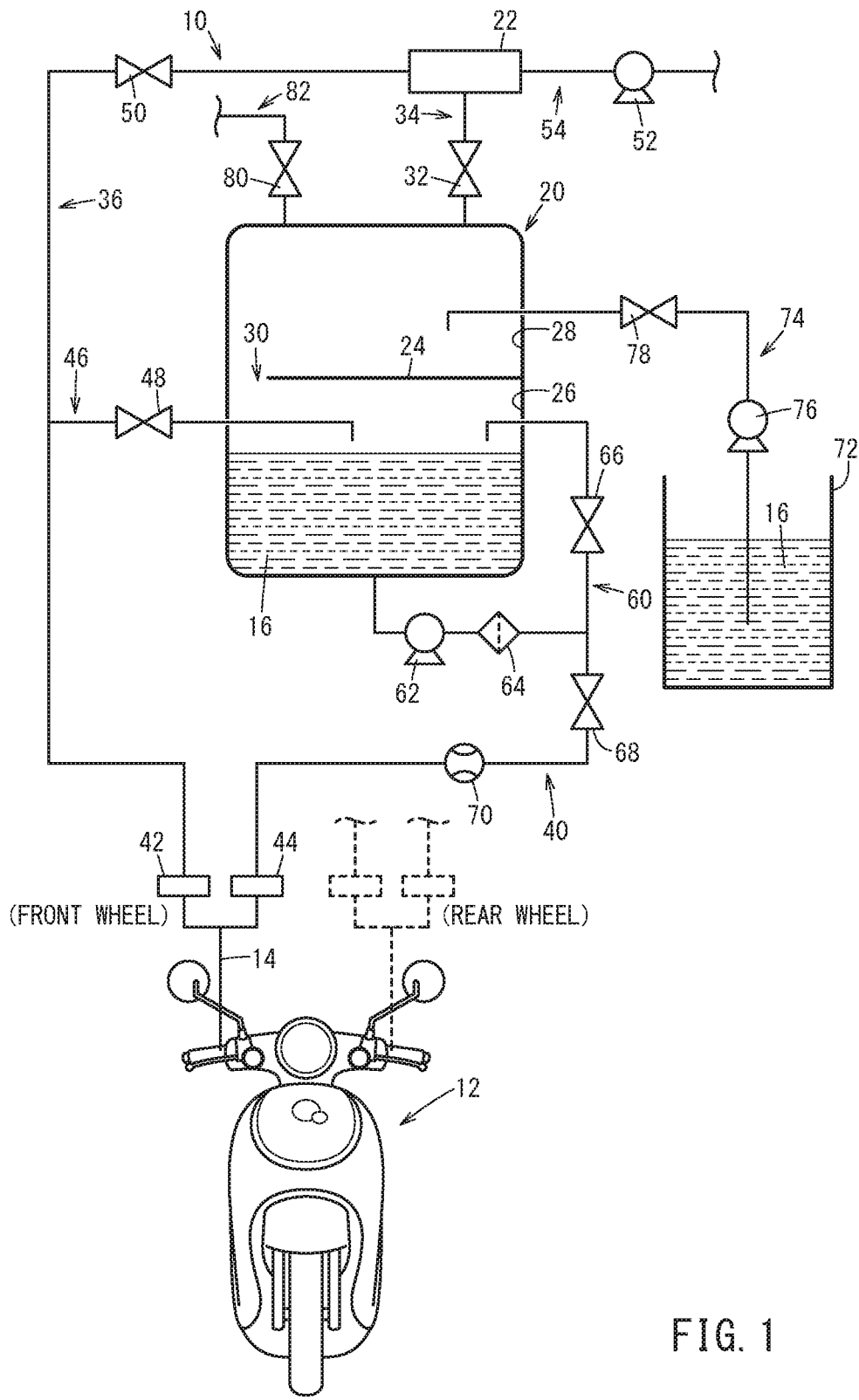
FIG. 1 is a schematic structure system diagram schematically illustrating a structure of a brake fluid collection and supply device according to an embodiment of the present invention.

FIG. 1 is a schematic structure system diagram schematically illustrating a structure of a brake fluid collection and supply device 10 according to the present embodiment. This brake fluid collection and supply device 10 is used to collect brake fluid 16 from a brake system 14 of a motorcycle (hereinafter also referred to as "vehicle body") 12 and then return the brake fluid 16 to the brake system 14. Note that although one vehicle body 12 includes two brakes, a brake for a front wheel and a brake for a rear wheel, FIG. 1 illustrates only the brake for the front wheel. In order to help the understanding, the brake system 14 is illustrated outside the vehicle body 12; however, the actual brake system 14 is provided within the vehicle body 12.

Figure 2:
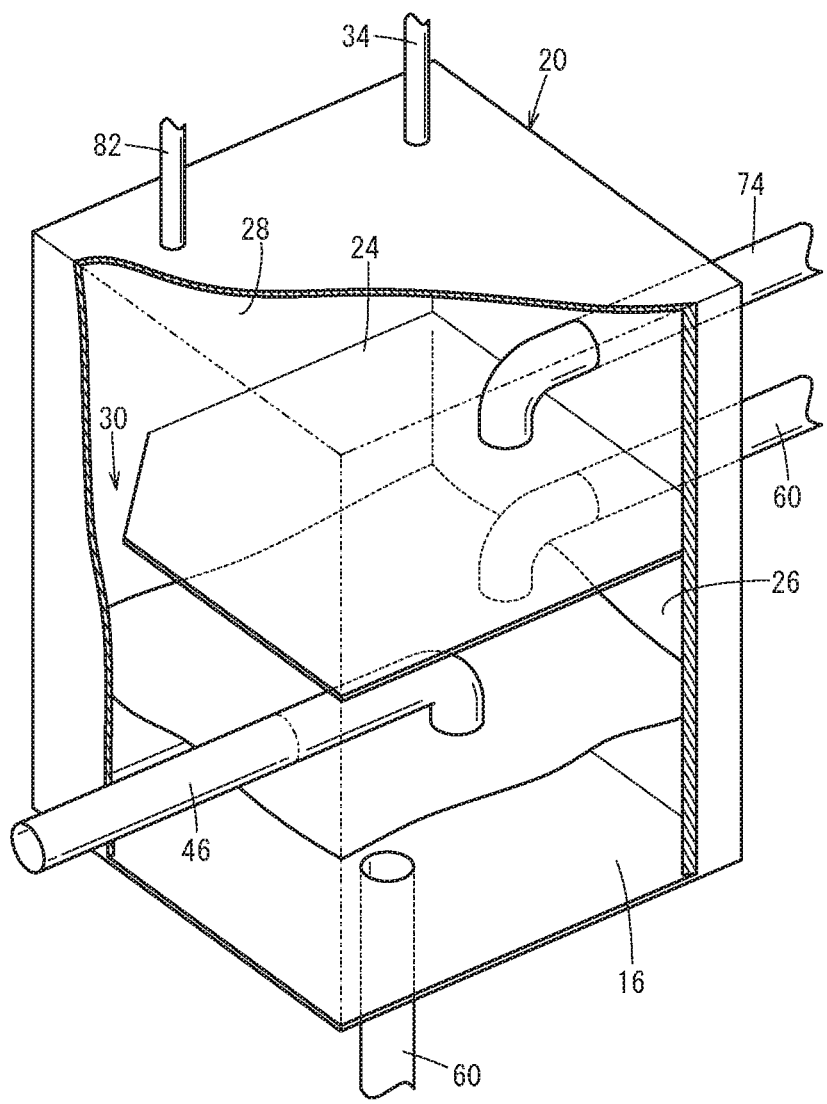
FIG. 2 is a schematic perspective view, a part of which is cross-sectional, of an entire gas-liquid separation tank included in the brake fluid collection and supply device illustrated in FIG. 1.

The brake fluid collection and supply device 10 includes a gas-liquid separation tank 20 and a sub-tank 22 disposed above the gas-liquid separation tank 20. The gas-liquid separation tank 20 has an approximately rectangular parallelepiped shape as illustrated in FIG. 2, and therefore the horizontal cross-sectional shape thereof is an approximate quadrangle. Inside the gas-liquid separation tank 20, a section wall 24 extending along the horizontal direction is provided. By this section wall 24, the inside of the gas-liquid separation tank 20 is sectioned into two chambers vertically. Hereinafter, the chamber on the lower side is referred to as a lower chamber 26 and the chamber on the upper side is referred to as an upper chamber 28. The lower chamber 26 has a larger capacity than the upper chamber 28 and the capacity ratio is about 3:1. The gas-liquid separation is performed mainly in the lower chamber 26 as described below.

The section wall 24 that forms the lower chamber 26 and the upper chamber 28 includes an opening 30 with an approximately triangular shape in a left rear corner part in FIG. 2. The lower chamber 26 and the upper chamber 28 communicate with each other only through this opening 30.

The sub-tank 22 is connected to the gas-liquid separation tank 20 through a sub-intake line 34 including a first communication switch valve 32. The sub-tank 22 is to perform the gas-liquid separation on the brake fluid 16 in a mist form that has come up from the upper chamber 28, and the capacity of the sub-tank 22 is smaller than that of the upper chamber 28. The capacity ratio between the upper chamber 28 and the sub-tank 22 is about 2:1. That is to say, the capacity ratio among the lower chamber 26, the upper chamber 28, and the sub-tank 22 is about 6:2:1.

The gas-liquid separation tank 20 and the brake system 14 of the vehicle body 12 are connected to each other through a main intake line 36 and a supply line 40 (see FIG. 1). Note that the main intake line 36 and the supply line 40 are respectively provided with a collection side jig 42 and a supply side jig 44 each having an open/close valve that is not shown.

From the main intake line 36, a collection line 46 is branched. That is to say, the main intake line 36 and the collection line 46 are merged on the upstream side. The collection line 46 includes a first open/close valve 48, and has a downstream side end downstream of the first open/close valve 48, penetrating a side wall of the lower chamber 26 to enter the lower chamber 26. As illustrated in FIG. 2, the downstream side end of the collection line 46 is positioned approximately diagonally to the opening 30.

In a part of the main intake line 36, a second communication switch valve 50 is provided downstream of the branching point of the collection line 46. Another part of the main intake line 36 downstream of the second communication switch valve 50 is connected to the sub-tank 22. The sub-tank 22 is further connected to an exhaust line 54 where an intake pump 52 serving as an intake means is provided. When the first communication switch valve 32 is opened and the second communication switch valve 50 is closed, the exhaust line 54 communicates with the inside of the gas-liquid separation tank 20 through the inside of the sub-tank 22 and the sub-intake line 34. On the contrary, when the first communication switch valve 32 is closed and the second communication switch valve 50 is opened, the exhaust line 54 communicates with the main intake line 36 through the inside of the sub-tank 22.

The gas-liquid separation tank 20 is further provided with a circulation line 60 for circulating the brake fluid 16 in the lower chamber 26. A circulation line upstream side end part of the circulation line 60 used to discharge the brake fluid 16 from the lower chamber 26 is connected to a bottom part of the lower chamber 26, and a circulation line downstream side end part of the circulation line 60 used to return the brake fluid 16 to the lower chamber 26 penetrates the side wall of the lower chamber 26 to enter the lower chamber 26 (see FIG. 2). This circulation line 60 includes a multi-purpose pump 62 serving as a circulating means and a supplying means, a filter 64, and a first line switch valve 66 in this order from the upstream side.

The supply line 40 is branched from the circulation line 60. That is to say, the circulation line 60 and the supply line 40 are merged upstream of the branching point. The supply line 40 is branched from between the filter 64 and the first line switch valve 66. On the other hand, a supply line downstream side end part is connected to the supply side jig 44. The supply line 40 includes a second line switch valve 68 and a flowmeter 70 in this order.

When one of the first line switch valve 66 and the second line switch valve 68 is opened, the other is closed. When the first line switch valve 66 is opened and the second line switch valve 68 is closed, the brake fluid 16 discharged from the gas-liquid separation tank 20 is returned to the lower chamber 26 through the circulation line 60. On the contrary, when the first line switch valve 66 is closed and the second line switch valve 68 is opened, the brake fluid 16 is sent to the brake system 14 of the vehicle body 12 through the supply line 40 and the supply side jig 44.

The brake fluid collection and supply device 10 further includes a storage tank 72. The storage tank 72 stores the new brake fluid 16 in advance separately from the brake fluid 16 in the brake system 14 in the vehicle body 12. Between the storage tank 72 and the gas-liquid separation tank 20, a replenishing line 74 is provided. An upstream side end part of the replenishing line 74 is inserted into the storage tank 72 and a downstream side end part thereof penetrates a side wall of the upper chamber 28 to enter the upper chamber 28 (see FIG. 2).

The replenishing line 74 includes a liquid transfer pump 76 as a liquid transferring means of transferring the brake fluid 16 from the storage tank 72 to the upper chamber 28 of the gas-liquid separation tank 20. In addition, a second open/close valve 78 for opening/closing the replenishing line 74 is provided downstream of the liquid transfer pump 76.

On a top plate part of the gas-liquid separation tank 20, an open line 82 including an open valve 80 is provided. When the open valve 80 is opened, the upper chamber 28 communicates with the outside of the gas-liquid separation tank 20 through the open line 82. Therefore, the pressure in the upper chamber 28 becomes equal to the pressure outside the gas-liquid separation tank 20. On the other hand, when the open valve 80 is closed, the communication between the upper chamber 28 and the outside is blocked.

The brake fluid collection and supply device 10 according to the present embodiment is configured as above basically, and next, the operation effect is described regarding the brake fluid collection and supply method according to the present embodiment. Note that the steps below are performed in accordance with the sequence control by a control circuit (not shown).

Figure 3:
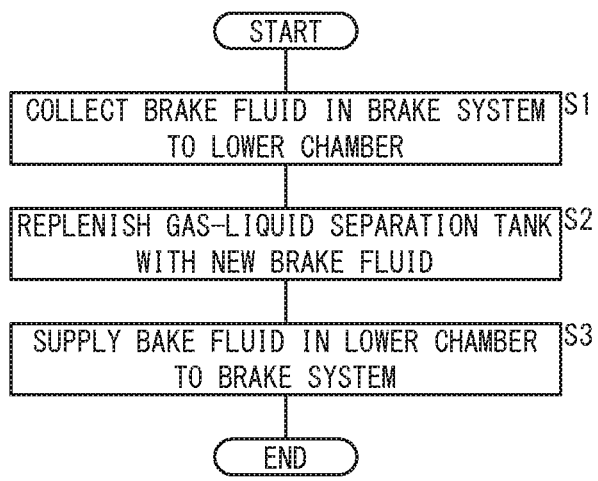
FIG. 3 is a schematic flowchart of a brake fluid collection and supply method according to the embodiment of the present invention.

FIG. 3 is a schematic flowchart of the brake fluid collection and supply method according to the present embodiment. The brake fluid collection and supply method includes: a collecting step S1 of collecting the brake fluid 16 in the brake system 14 to the lower chamber 26 of the gas-liquid separation tank 20 through the main intake line 36; a replenishing step S2 of replenishing the gas-liquid separation tank 20 with the new brake fluid 16 while the gas in the brake system 14 is drawn through the sub-tank 22; and a supplying step S3 of supplying the brake fluid 16 in the lower chamber 26 to the brake system 14 while the gas in the collection line 46 is drawn through the sub-tank 22 only.

Figure 4:
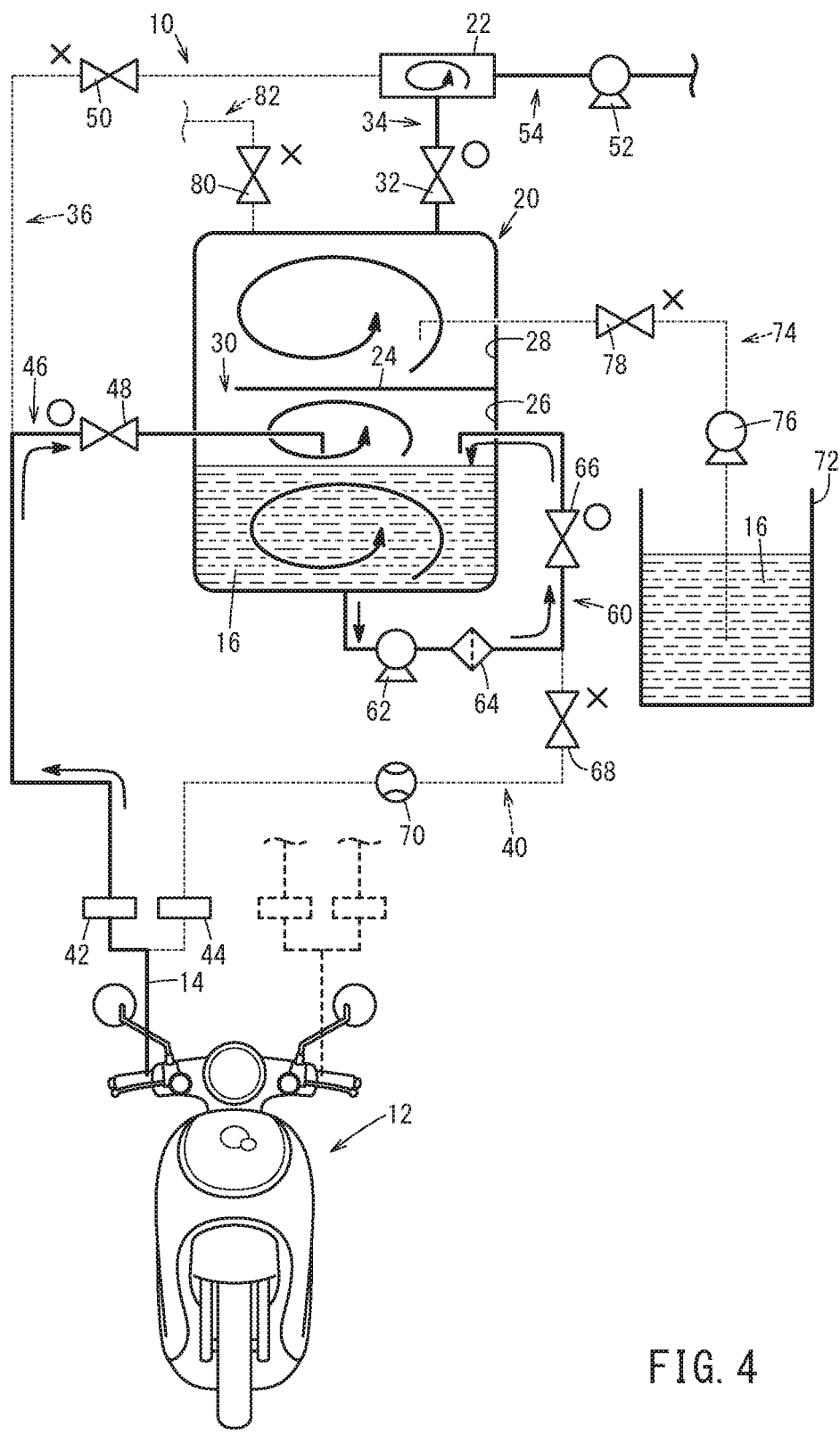
FIG. 4 is a diagram for describing the procedure, illustrating the flow of fluid when a collecting step is performed in the brake fluid collection and supply device illustrated in FIG. 1.

First, the collection side jig 42 and the supply side jig 44 are connected to the brake system 14 of the vehicle body 12. After that, the collecting step S1 of collecting the brake fluid 16 from the vehicle body 12 is performed. Specifically, just after recognizing the connection of the collection side jig 42 and the supply side jig 44 to the brake system 14, the control circuit sends an order signal that opens the first communication switch valve 32, the first open/close valve 48, and the first line switch valve 66 and closes the second communication switch valve 50, the second line switch valve 68, the second open/close valve 78, and the open valve 80, and also sends an order signal that energizes the intake pump 52 and the multi-purpose pump 62 as illustrated in FIG. 4. As a result, the gas in the gas-liquid separation tank 20 is drawn through the sub-tank 22, and thus, the gas-liquid separation tank 20 and the sub-tank 22 have the negative pressure. Therefore, the atmosphere in the collection line 46 and the brake fluid 16 in the brake system 14 are transferred to the lower chamber 26 through the collection line 46.

The brake fluid 16 transferred to the lower chamber 26 is discharged from the bottom part of the lower chamber 26 to the outside of the lower chamber 26 by the action of the multi-purpose pump 62, and is returned to the lower chamber 26 through the circulation line 60. That is to say, the brake fluid 16 is circulated. Since the downstream side end part of the circulation line 60 is positioned at an upper part of the lower chamber 26, the brake fluid 16 led from the circulation line 60 is poured onto the brake fluid 16 in the lower chamber 26. If a foreign substance exists in the brake fluid 16, the foreign substance is removed by the filter 64 in this circulation process.

In this manner, the brake fluid 16 is discharged from the bottom part of the lower chamber 26 and the brake fluid 16 flowing in the circulation line 60 is poured from above. In this process, the brake fluid 16 in the lower chamber 26 causes a counterflow. In other words, the brake fluid 16 in the lower chamber 26 is stirred. By this stirring, a centrifugal separation action is caused and the brake fluid 16 and the gas existing in the brake fluid 16 are separated from each other. That is to say, since the gas-liquid separation tank 20 has the negative pressure to make the brake fluid 16 collected in the lower chamber 26 circulate, the gas-liquid separation for the collected brake fluid 16 can be performed.

In addition, the brake fluid 16 under the negative-pressure environment boils at the low pressure even at room temperature; therefore, the gas existing in the brake fluid 16 expands and goes up as bubbles, which burst out on the liquid surface. The gas having existed in the brake fluid goes up together with the gas in the lower chamber 26.

The gas mostly goes up in the lower chamber 26 and is brought into contact with the section wall 24. Here, the downstream side end of the collection line 46 and the opening 30 of the section wall 24 are placed approximately diagonally. Therefore, even if the brake fluid 16 introduced from the collection line 46 to the lower chamber 26 instantly vaporizes to become steam, the steam does not pass the opening 30 and is brought into contact with the section wall 24.

Since the gas (including the steam) is brought into contact with the section wall 24, the gas having gone up descends to the bottom part of the lower chamber 26. As a result, the gas also causes a counterflow. The gas includes the brake fluid 16 in the mist form, and as the gas is brought into contact with the brake fluid 16, the brake fluid in the gas is returned to the brake fluid 16. When the gas is brought into contact with the section wall 24, the brake fluid in the gas is condensed into liquid droplets, which are then dropped into the brake fluid 16. Thus, the brake fluid 16 is mostly separated from the gas.

Since the gas is continuously drawn from the upper chamber 28, the gas goes up through the opening 30 so as to flow into the upper chamber 28. While the gas goes up to the sub-intake line 34, the gas is brought into contact with the top plate part of the upper chamber 28. Thus, the gas is turned to go toward the bottom part. As a result, the gas causes a counterflow also in the upper chamber 28. As the gas that has caused a counterflow is brought into contact with an inner wall of the upper chamber 28, the gas and the brake fluid 16 included in the gas are separated from each other. Thus, the gas-liquid separation is performed also in the upper chamber 28.

The gas resulting from the aforementioned gas-liquid separation process in the gas-liquid separation tank 20 passes the sub-intake line 34 by the gas drawing action of the intake pump 52 and flows into the sub-tank 22 provided above the gas-liquid separation tank 20. The gas that goes up in the sub-tank 22 is turned to flow toward the bottom part as the gas is brought into contact with the top plate part of the sub-tank 22. Therefore, the gas causes a counterflow also in the sub-tank 22. As the gas that causes a counterflow is brought into contact with an inner wall of the sub-tank 22, the gas and the brake fluid 16 included in the gas are separated from each other. However, since the brake fluid 16 has been mostly separated in the gas-liquid separation tank 20, the amount of brake fluid 16 to be separated in the sub-tank 22 is just a little.

As is understood from the above description, the gas-liquid separation is performed at three places: the lower chamber 26, the upper chamber 28, and the sub-tank 22 in the present embodiment. Since the horizontal cross-sectional shape of each of the lower chamber 26, the upper chamber 28, and the sub-tank 22 is an approximately quadrangular, a counterflow can be caused comparatively easily. Thus, the efficiency of the gas-liquid separation is improved.

The gas is then drawn by the intake pump 52 through the exhaust line 54. As described above, since the brake fluid 16 has been separated from the gas, the entry of the brake fluid 16 into the intake pump 52 or the deterioration in the gas drawing capability of the intake pump 52 because of the entry of the brake fluid 16 can be avoided. That is to say, the sub-tank 22 functions as a protection tank that prevents the brake fluid 16 from affecting the intake pump 52.

Therefore, a smaller pump can be employed as the intake pump 52. This is because, as described above, the entry of the brake fluid 16 into the intake pump 52 is suppressed and the gas drawing capability of the intake pump 52 can be therefore maintained.

Figure 5:
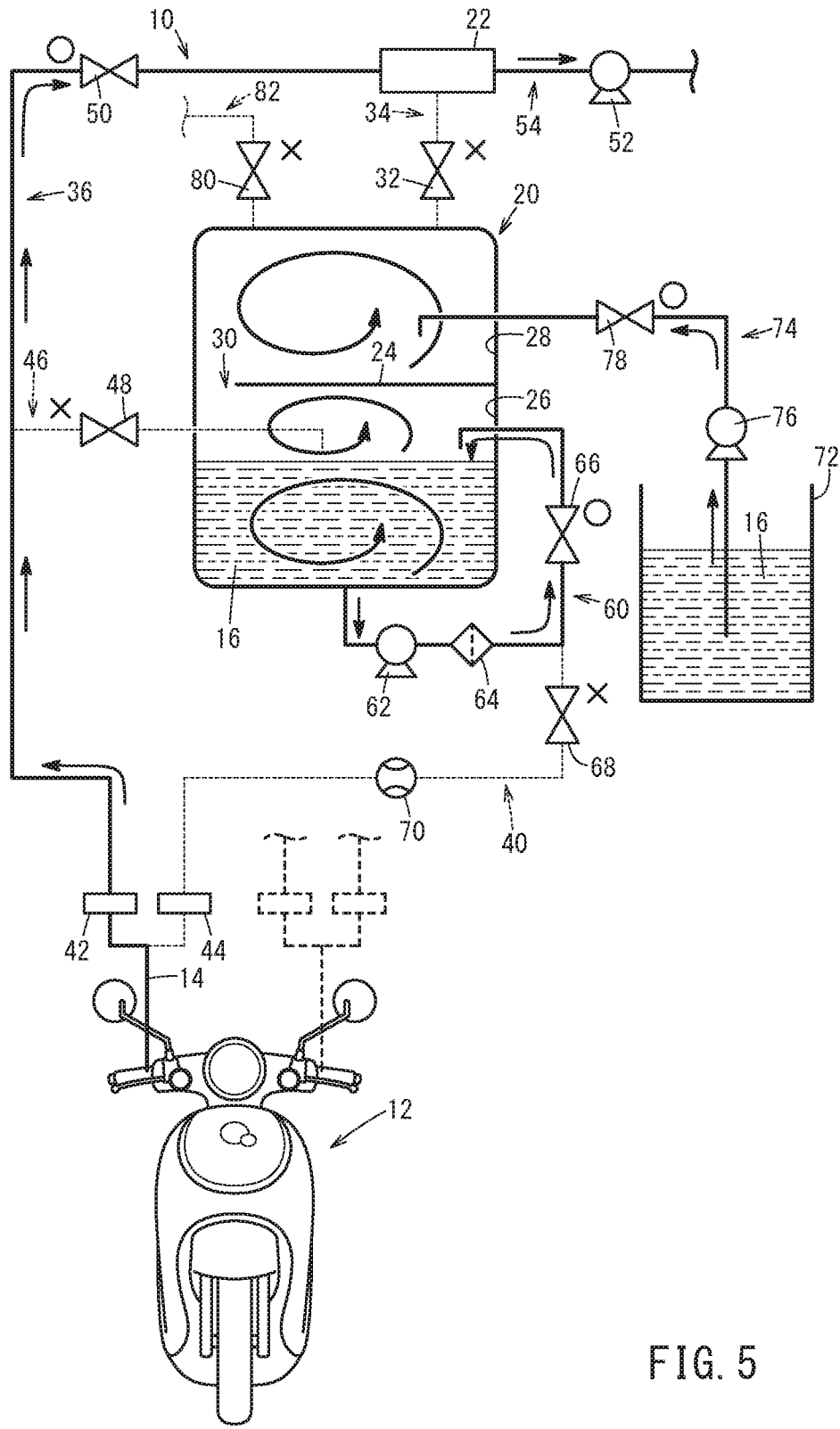
FIG. 5 is a diagram for describing the procedure, illustrating the flow of fluid when a replenishing step is performed in the brake fluid collection and supply device illustrated in FIG. 1.

Next, the replenishing step S2 is performed. That is to say, as illustrated in FIG. 5, the control circuit sends an order signal that closes the first communication switch valve 32 and the first open/close valve 48 and opens the second communication switch valve 50 and the second open/close valve 78, and also sends an order signal that energizes the liquid transfer pump 76. Note that the first line switch valve 66 is kept open and the second line switch valve 68 and the open valve 80 are kept closed.

As a result, the brake system 14 is drawn through the exhaust line 54. That is to say, the gas in the brake system 14 is discharged so as to flow in the exhaust line 54 through the sub-tank 22 by the gas drawing action of the intake pump 52. Thus, the brake system 14 has the negative pressure. Here, the drawing power of the intake pump 52 may be increased to be higher than that in the collecting step S1, thereby making the brake system 14 into what is called highly vacuum.

On the other hand, the new brake fluid 16 in the storage tank 72 is lifted up by a pumping action of the liquid transfer pump 76, and the brake fluid 16 flows into the upper chamber 28 of the gas-liquid separation tank 20 through the replenishing line 74. Thus, the new brake fluid 16 that flows in the upper chamber 28 promotes causing a counterflow of the gas in the upper chamber 28. Therefore, the gas-liquid separation in the upper chamber 28 advances more efficiently.

The new brake fluid 16 flows in the lower chamber 26 through the opening 30, and merges with the brake fluid 16 in the lower chamber 26. That is to say, the new brake fluid 16 is replenished.

During the replenishing step S2, the brake fluid 16 in the gas-liquid separation tank 20 still circulates. Thus, the gas-liquid separation still progresses. That is to say, in the present embodiment, the gas-liquid separation is performed on not just the collected brake fluid 16 but also the new brake fluid 16 that has been replenished.

Moreover, in the collecting step S1 and the replenishing step S2, the gas-liquid separation tank 20 has the negative pressure as described above. That is to say, in this state, the gas is discharged from the gas-liquid separation tank 20. Therefore, the entry of the moisture in the atmosphere or the like into the brake fluid 16 can be prevented.

Figure 6:
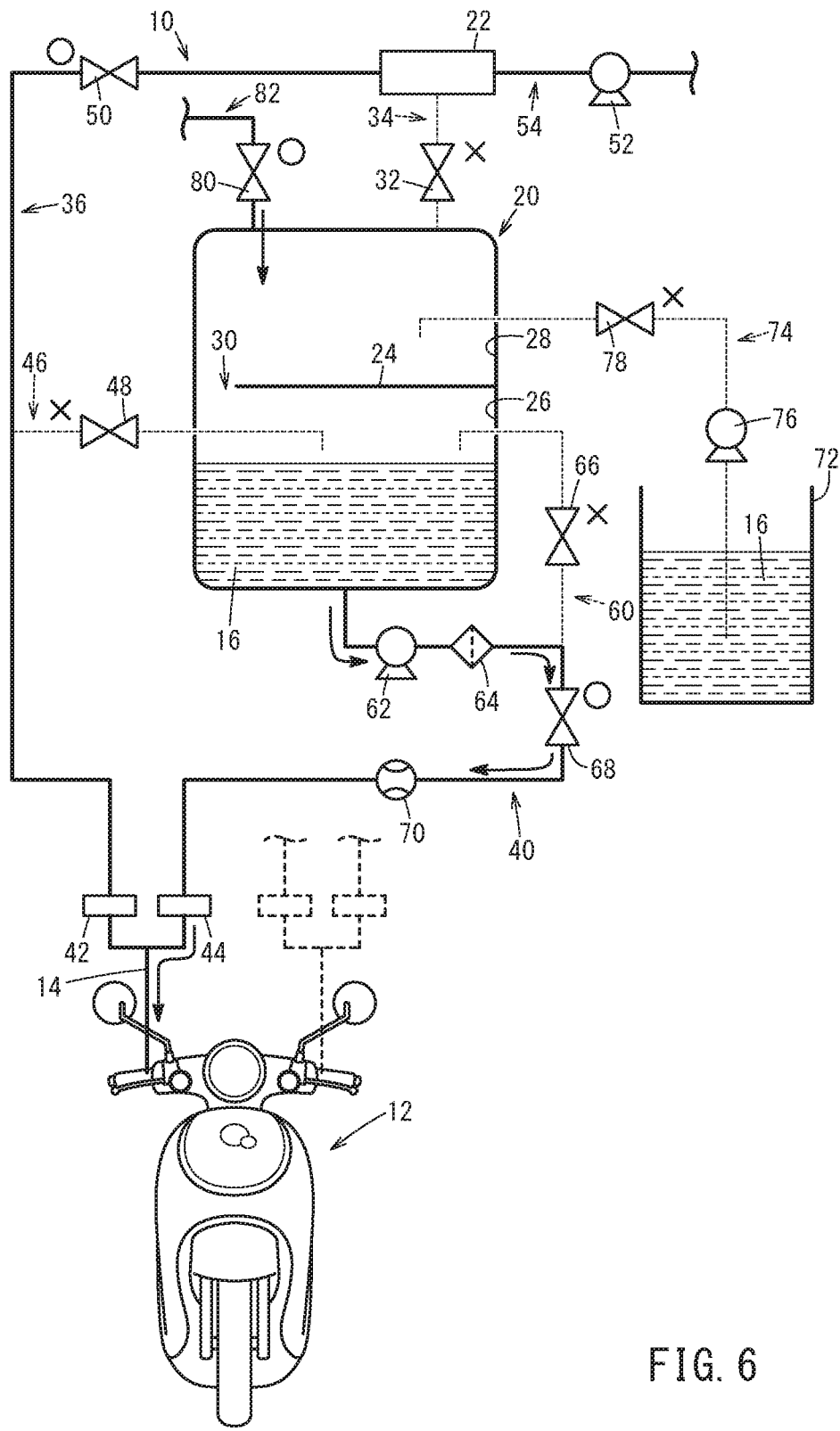
FIG. 6 is a diagram for describing the procedure, illustrating the flow of fluid when a supplying step is performed in the brake fluid collection and supply device illustrated in FIG. 1.

Next, the supplying step S3 is performed. That is to say, as illustrated in FIG. 6, the control circuit sends an order signal that closes the first line switch valve 66 and the second open/close valve 78 and opens the second line switch valve 68 and the open valve 80 while keeping the first communication switch valve 32 and the first open/close valve 48 closed and the second communication switch valve 50 open. Thus, the circulation of the brake fluid 16 in the lower chamber 26 and the replenishment with the new brake fluid 16 are stopped. Note that the collection side jig 42 includes an open/close valve (not shown), and since this open/close valve is closed in advance, keeping energizing the intake pump 52 will not draw the gas from the brake system 14 anymore.

On the other hand, the atmosphere flows into the upper chamber 28 from the open line 82. As a result, the pressure in the gas-liquid separation tank 20 becomes the positive pressure that is equal to the atmospheric pressure. Meanwhile, the brake system 14 still has the negative pressure. Thus, the pressure difference is generated between the gas-liquid separation tank 20 and the brake system 14 and moreover, the multi-purpose pump 62 is in the energized state; therefore, the brake fluid 16 in the lower chamber 26 easily passes the supply line 40 and is sent out from the supply side jig 44 to the brake system 14. That is to say, in the present embodiment, it is easy to supply the brake fluid 16 to the brake system 14.

Moreover, the supplied brake fluid 16 is the fluid that has been subjected to the gas-liquid separation under the negative pressure. Therefore, the entry of atmosphere (gas) or moisture is suppressed. That is to say, by the brake fluid collection and supply device 10, the brake fluid 16 to which the entry of atmosphere or moisture is prevented can be efficiently supplied to the vehicle body 12.

Thus, despite of having the simple and compact structure including the gas-liquid separation tank 20 sectioned into the lower chamber 26 and the upper chamber 28 and several lines connected to the gas-liquid separation tank 20, the brake fluid collection and supply device 10 can perform the gas-liquid separation on the brake fluid 16 efficiently. In addition, since the gas-liquid separation is performed under the negative pressure, the entry of atmosphere or moisture into the brake fluid 16 can be avoided effectively.

The present invention is not limited to the aforementioned embodiment in particular and various changes are possible in the range without departing from the concept of the present invention.

For example, the vehicle body 12 is not limited to the motorcycle in particular, and may be a four-wheeled vehicle or what is called a saddle type vehicle.

What is claimed is:

1. A brake fluid collection and supply device for performing gas-liquid separation on brake fluid collected from a brake system of a vehicle body and supplying the brake fluid after the gas-liquid separation to the vehicle body, the brake fluid collection and supply device comprising:
   a gas-liquid separation tank sectioned into a lower chamber and an upper chamber by a section wall including an opening;
   a sub-tank to which gas in the upper chamber can flow;
   a collection line through which the brake fluid is collected from the brake system to the gas-liquid separation tank;
   a main intake line communicating a branching point of the collection line and the sub-tank;
   a sub-intake line communicating the upper chamber of the gas-liquid separation tank and the sub-tank;
   an exhaust line continuing to the sub-tank and being downstream of the main intake line and the sub-intake line;
   an intake pump provided to the exhaust line and configured to draw gas from the gas-liquid separation tank through the sub-tank;
   a first communication switch valve included in the sub-intake line and located upstream of the sub-tank;
   a second communication switch valve included in the main intake line and located upstream of the sub-tank;
   a circulation line used to discharge the brake fluid from the lower chamber and return the brake fluid to the lower chamber;
   a multi-purpose pump that is provided to the circulation line and configured to circulate the brake fluid in the lower chamber in the circulation line;
   a supply line that supplies the brake fluid in the lower chamber to the brake system;
   a replenishing line that replenishes the gas-liquid separation tank with new brake fluid; and
   a liquid transfer pump that is provided to the replenishing line and configured to transfer the new brake fluid to the gas-liquid separation tank,
   wherein the intake pump selectively draws gas through both the gas-liquid separation tank and the sub-tank or through only the sub-tank, and
   the gas is drawn through both the gas-liquid separation tank and the sub-tank when the second communication switch valve is in a closed state and the first communication switch valve is in an open state, and the gas is drawn through only the sub-tank when the second communication switch valve is in an open state and the first communication switch valve is in a closed state.

2. The brake fluid collection and supply device according to claim 1, wherein the sub-tank is disposed above the gas-liquid separation tank.

3. The brake fluid collection and supply device according to claim 1, wherein the replenishing line is provided to communicate with the upper chamber.

4. The brake fluid collection and supply device according to claim 1, wherein the supply line is branched from a point of the circulation line at a location upstream of the multi-purpose pump,
   in the circulation line, a first line switch valve is provided downstream of a branching point of the supply line,
   a second line switch valve is included in the supply line,
   the multi-purpose pump is upstream of the branching point of the supply line, and
   the brake fluid in the lower chamber is made to flow to the circulation line when the first line switch valve is in an open state and the second line switch valve is in a closed state, and the brake fluid in the lower chamber is made to flow the supply line when the first line switch valve is in a closed state and the second line switch valve is an open state.

5. The brake fluid collection and supply device according to claim 1, wherein the gas-liquid separation tank has a horizontal cross-sectional shape that is quadrangular.

6. The brake fluid collection and supply device according to claim 1, wherein the lower chamber, the upper chamber, and the sub-tank have capacity decreasing in this order.

\* \* \* \* \*